(12) United States Patent
Dunne et al.

(10) Patent No.: US 6,745,036 B1
(45) Date of Patent: Jun. 1, 2004

(54) LOCATION BEACON SYSTEM

(75) Inventors: Frank Dunne, Dublin (IE); Brian J. Forde, Dublin (IE); Paul C. Weinmann, Dublin (IE); Marc Smaak, Bergen Op Zoom (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/464,005

(22) Filed: Dec. 15, 1999

(30) Foreign Application Priority Data

Dec. 19, 1998 (GB) .............................................. 9827989

(51) Int. Cl.⁷ ............................................. H04Q 07/20
(52) U.S. Cl. ................................ 455/456.1; 455/456.3; 455/422.1
(58) Field of Search ................................ 455/456, 500, 455/457, 524, 526, 421, 11.1, 462, 7, 13.1, 513, 522, 422; 342/457, 387, 463; 701/300; 340/988, 989–994, 7.36, 825.49

(56) References Cited

U.S. PATENT DOCUMENTS

| | | | | |
|---|---|---|---|---|
| 4,611,198 A | * | 9/1986 | Levinson et al. | 340/539.11 |
| 4,649,385 A | * | 3/1987 | Aires et al. | 379/56.3 |
| 5,121,126 A | * | 6/1992 | Clagett | 342/419 |
| 5,515,426 A | * | 5/1996 | Yacenda et al. | 379/201.07 |
| 5,621,414 A | * | 4/1997 | Nakagawa | 342/350 |
| 5,850,609 A | * | 12/1998 | Sugarbroad et al. | 455/456.1 |
| 6,055,434 A | * | 4/2000 | Seraj | 455/456.1 |

(List continued on next page.)

FOREIGN PATENT DOCUMENTS

| | | | | |
|---|---|---|---|---|
| EP | 0614322 A1 | 9/1994 | ............ | H04Q/7/04 |
| EP | 0644517 A2 | 3/1995 | .......... | G08G/1/967 |
| WO | WO9425937 | 11/1994 | ............ | G07C/1/20 |

OTHER PUBLICATIONS

Owen, F.C., "The DECT Radio Interface", IEE Colloquium on CT2/CAI and DECT Cordless Telecommunications, pp. 7/1 to 7/6, Nov. 1990, The Institution of Electrical Engineers, London, UK.*

Patent Abstract of Japan JP 07274240 A, Int. Cl. H04Q 7/34, Publication Date: Oct. 20, 1995.

Patent Abstract of Japan JP 548524 A, Int. Cl. H04B 7/26, Publication Date: Feb. 26, 1993.

Patent Abstract of Japan JP 07079482 A, Int. Cl. H04Q 7/38, Publication Date: Mar. 20, 1995.

*Primary Examiner*—Jean Gelin
(74) *Attorney, Agent, or Firm*—Jack D. Slobod (57) ABSTRACT

A location system for establishing the position of a portable terminal that transmits identity information indicative of the identity of the individual terminal is provided. The portable terminals transmit their identity information at a first predetermined power level. The system includes location beacons having a known position and the beacons are capable of receiving the identity information transmitted by the portable terminals. Each location beacon generates an output signal when identity information of a portable terminal is received at that beacon with a power level greater than a predetermined threshold value, which value may be set independently for each beacon. The output signal is indicative that such a portable terminal is within a particular distance range of the beacon and the output signal is made available to a control unit. By providing the control unit with information relating to the position of each of the location beacons, it is possible to establish the position of a particular portable terminal as being within a given range of that known beacon position when the beacon receives identity information associated with that portable terminal with a power level greater than the beacon threshold value. In one embodiment the portable terminals are DECT handsets.

14 Claims, 3 Drawing Sheets

U.S. PATENT DOCUMENTS 6,119,015 A * 9/2000 Eun .......................... 455/502
6,141,533 A * 10/2000 Wilson et al. ............. 455/11.1
6,198,919 B1 * 3/2001 Buytaert et al. ........... 455/426
6,226,528 B1 * 5/2001 son .Akerberg et al. .... 455/554
6,349,211 B2 * 2/2002 Koshima et al. ........... 455/457
6,404,775 B1 * 6/2002 Leslie et al. .................. 455/7

* cited by examiner

LOCATION BEACON SYSTEM

The present invention relates to a location system for establishing the position of a portable or mobile terminal and in particular to a location system employing location beacons.

In telecommunication systems of the type having one or more mobile or portable terminals, for example a portable mobile radio telephone handset, the ability to determine the location of such a terminal can be of benefit with respect to the operation and the functionality of the system. Information relating to the location of the mobile terminal allows operational parameters to be adjusted for optimising performance and the use of resources. Furthermore, the ability to establish the actual position of a mobile or portable terminal is useful in its own right, since by equipping a user with such a terminal it is possible to locate the user and track their movements. This is of particular benefit where the user is a lone worker, someone operating in hazardous environments, or perhaps a member of the medical profession or a member of a maintenance team. The ability to locate and track security personnel is of particular benefit.

The accuracy to which the position of a portable terminal (and hence the user of the terminal) needs to be established will vary depending on the reason for gathering the location information and the environment. In the case of a farm worker in an empty field, for example, it may be sufficient to merely establish that the worker is in the field. Accurate location of the worker is not required and the worker may be located visually. In contrast, a security guard whose welfare is a prime consideration needs to be located with a greater accuracy, especially if working within a building having a number of rooms or corridors that will render visual contact impossible. It will be apparent that a location system should be capable of providing location information of a portable or mobile terminal to the required accuracy.

In a wireless telecommunications system having one or more base station for communication with the portable terminals, the only information normally available that relates to the location of a terminal is obtained through knowing which base station is handling the communication with the portable terminal and also knowing where the base station is located.

One known communication system provided with means for detecting the position of portable terminals is the subject of the abstract of Japanese patent application number JP 0 7 274240A. The system includes a number of beacon oscillators geographically distributed around the operating domain of the portable terminals. The beacon oscillators emit a position signal that is picked up by a nearby portable terminal via a RF receiver provided in the portable terminal. Any such position signal, if picked up by the portable terminal, is combined with an identification signal of that associated with that portable terminal and relayed by the mobile terminal to a host computer of the communication system. The combined signal is sent to the computer via a radio transceiver provided in the portable terminal which transceiver communicates with a radio master station that is connected to the host computer.

A problem with this system is that the portable terminal uses an RF section for communicating with the radio master station and a further RF section for receiving information from the beacons. The presence of two RF sections as opposed to one is likely to increase cost and complexity of the portable terminal. Furthermore, should it be desirable to provide a known, established, communications system such as a GSM mobile radio cellular telephone system or the like with a location system operating in accordance with the principles of the cited known art, each portable terminal must be replaced by one having the additional hardware for receiving signals from the beacons. If beacons were merely added to the established system, existing portable terminals would not be able to detect their presence.

Another potential problem is the additional power consumption that a separate, additional RF section can give rise to. Furthermore, some type of power management would be highly desirable because an additional RF section that is continuously operating to receive beacon signals will place a significant demand on power requirements. This is undesirable where the power supply is exhaustible, for example as is the case when the power is provided by a battery.

In this type of known system where beacons transmit to portable terminals, failure of a location beacon results in the position signals from that beacon ceasing. Unfortunately such a condition is not readily apparent to the system since the portable terminals cannot differentiate between this condition and the condition of merely being out of range of that beacon. Therefore, in this type of system, it is necessary to routinely visit and locally test each beacon which can be time consuming. Furthermore, such testing may also be difficult if the beacon is not easily accessible—for example in those cases where it is out of reach, buried in a wall or located in some other dangerous environment.

It is an object of the present invention to provide a location system that will allow the position of a portable terminal to be established with a greater accuracy than is provided through merely knowing which base station is handling the communication with the portable terminal and also knowing where that base station is located.

It is yet another object of the present invention to provide a location system that will allow the position of a portable terminal to be established, wherein any additional power consumption of the portable terminal as a result of being provided with the location system is minimal in comparison to a portable terminal not benefiting from the system of the present invention.

In accordance with the present invention there is provided a location system for establishing the position of a portable terminal that transmits identity information indicative of the identity of the individual terminal at a first predetermined power level, the system including: one or more such portable terminal; at least one location beacon having a known position and capable of receiving identity information, and a control unit, wherein the location beacon is provided with means for generating an output signal when identity information is received at the beacon with a power level greater than a predetermined threshold value, the output signal indicating that a portable terminal is within a particular distance range from the beacon, and means for making the output signal available to the control unit.

The identity information transmitted by the portable terminal may be transmitted continuously, intermittently or on demand. In the latter case this may be initiated by a component of the system. Alternatively it may be initiated by the user of the portable terminal, for example by issuing a command to initiate a communication or through originating a call, such as an alarm call.

It is noted that information (in the form of the beacon output signal) is made available to the control unit from the location beacons, in contrast to the above mentioned known system where information is sent to the host computer from the portable terminal. The difference in this chain of communication has an inherent advantage since it can permit the control unit to identify defective or failed location beacons, as those beacons will never produce an output signal. Indeed, the beacons could make available a signal to the central control unit periodically to indicate correct operation.

Communication between the central control unit and the location beacons may be enhanced to provide two way communication. Such communication can allow remote monitoring of the beacons to establish correct functionality and allow changes to be made to beacon operating parameters remotely. Where the beacons include a software component, system or application software could be downloaded to the beacons remotely. All of these features are especially useful if the beacons are not readily accessible.

Where the portable terminal is also provided with other communication functions, for example as a mobile or cordless telephone is for communication of voice or data files, the identity information may be transmitted with the same power that is used for transmission of information associated with the other communication functions, or the identity information may be transmitted with a different power. This can be used to add flexibility to the system in terms of reducing power consumption. Because the portable terminal transmits rather than receives identity information this eliminates the need for the portable terminal to monitor for location beacon signals (an activity which has potential for significant power consumption). This can allow additional control over power consumption due to the activity of transmitting identity information. For example, the identity information could be transmitted less often to conserve power.

The portable terminals may be mobile components, such as handsets of a mobile or cordless telephone system, pagers or mobile computing apparatus. Indeed portable terminals may include portable communications devices that are configured to perform a particular function or may be configured to perform one of a number of functions.

A plurality of location beacons may be provided. The system may then include means for distinguishing between outputs of different location beacons. It is preferable that each location beacon generates an output signal that may be distinguished from outputs produced by other location beacons.

One, several, or all beacons may be provided with means for setting the predetermined threshold value. Furthermore, one, several of all beacons may be provided with means for adjusting the predetermined threshold value. If more than one beacon is present within the system the threshold value of individual beacons may be set and/or adjusted independently of the threshold values of other beacons. This has the advantage of allowing beacons to be individually tailored to detect portable terminals within particular chosen distance ranges.

Where two way communication between a beacon and the control unit is provided, it may be possible to alter the threshold value of that beacon remotely from the control unit.

Preferably the control unit holds information relating to the positioning of the or each location beacon therefore allowing an output signal of a given beacon to be associated with that position. If information relating to the threshold value of the beacons is also known this will give an indication of the coverage area of a particular beacon and therefore the accuracy to which the position of a portable terminal may be established, based on the occurrence of a particular beacon output signal.

Whilst the location system of the present invention may be implemented separately, in a preferred embodiment it is integrated in a telecommunications system.

In one arrangement the portable terminal is based on a DECT portable part and the terminal exchanges information in a manner based on the DECT standard. (DECT is an abbreviation for Digital Enhanced Cordless Telecommunications and is defined in standard ETS 300 175 of the European Telecommunications Standards Institute. The Standard includes a number of parts.) Furthermore the location beacons may be based on a DECT portable part and the beacons exchange information in a manner based on the DECT standard. In each case some deviation from the standards may be necessary to obtain the required operation.

Other aspects and optional features of the present invention appear in the appended claims, to which reference should now be made and the disclosure of which is incorporated herein by reference.

The present invention will now be described by way of example only with reference to the accompanying drawings in which.

Figure 1:
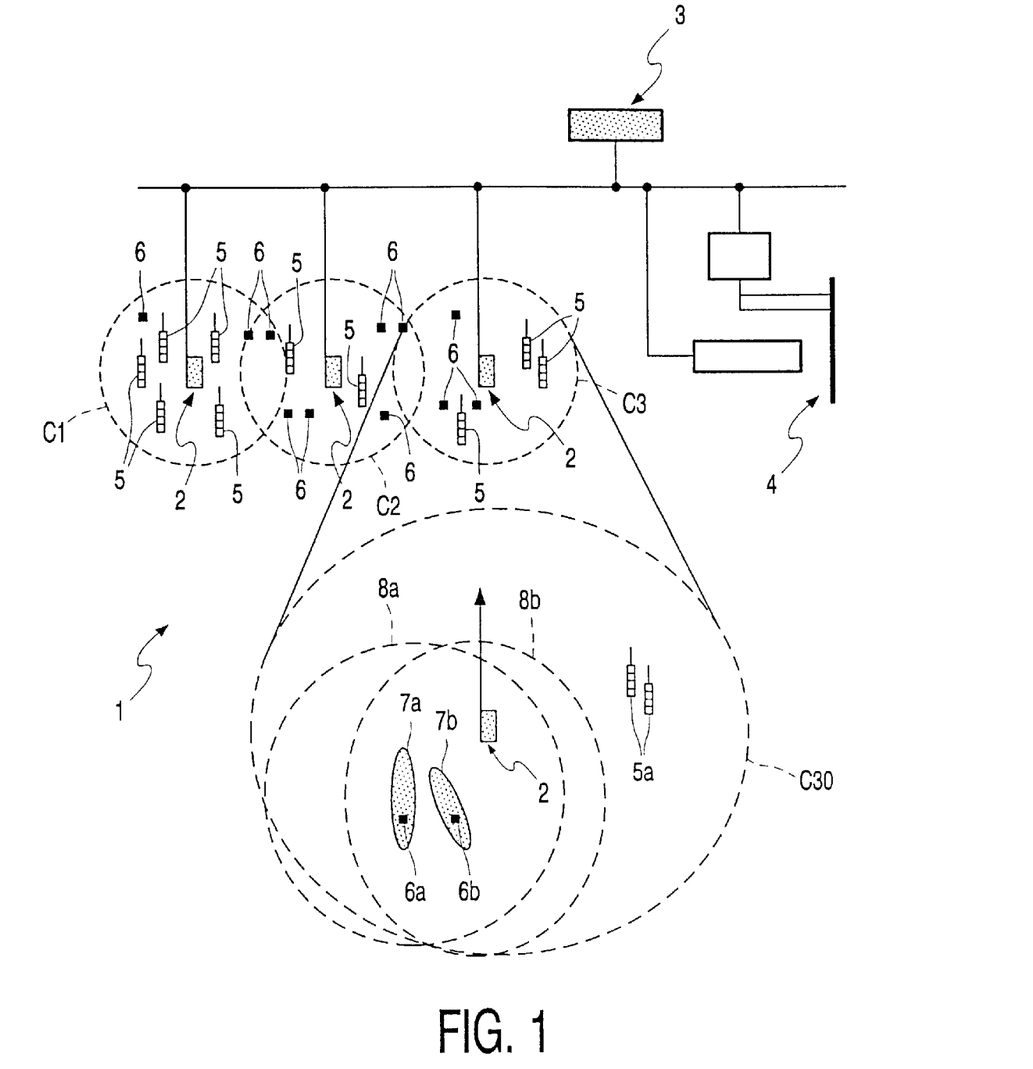
FIG. 1 shows a schematic representation of a first embodiment of a telecommunications system incorporating the present invention.

Referring to FIG. 1 a telecommunications system in the form of a DECT multicell system 1 includes a plurality of base stations or radio fixed parts (RFP's) 2 which are networked together for communication with each other. The RFP's 2 are also connectable via an interface to external telecommunication networks such as the public switched telephone network 4 although this is optional. The RFP's 2 are also connected via the network to a central control unit 3 which serves to control the general operation of the whole system including the interoperability of the RFP's 2 with each other. Although a number of RFP's 2 are used to form a multi cell system, it is possible to provide a single cell system which uses only one RFP 2. In a DECT system a portable terminal is known as the portable part (PP) and will include a portable radio termination (PT) for establishing communication with a RFP 2 via a wireless radio link or connection. The portable parts (PP's) 5 shown in FIG. 1 are capable of establishing such communication with a suitable RFP 2 via a wireless radio link or connection for the exchange of traffic such as voice or data, as is well known to the person skilled in the art.

As stated above, a DECT communications system may be provided with one RFP 2 or a number of RFP's 2. Obviously, if the system has only one RFP 2 then this RFP must cater for all connections that are established with the PP's 5. However, the system illustrated in FIG. 1 has a plurality of RFP's 2 with each of the three RFP's 2 illustrated having a coverage area of C1, C2 and C3 respectively. In the case of such a system the plurality of RFP's 2 are provided for the purpose of increasing system capacity and/or coverage area with connections being established between RFP's 2 and PP's 5 depending on the available link quality, which usually though not always results in a link being established between the PP 5 and the nearest RFP 2. Similarly, this can also be the case in other cellular mobile radio telephone systems, where a link is usually established between the portable terminal and the nearest base station although this will be subject to the loading level of the system and other constraints. Based on this reasoning, and as stated above, it is possible to attempt to estimate the approximate location of a portable terminal based on the location of the RFP 2 or base station servicing a connection to the portable terminal. This is often unreliable and often inaccurate, especially since some cellular systems employ single base stations to cover areas of many kilometres.

In order to assist in determining the location of a mobile terminal (in this example a PP 5), a number of location beacons 6 are geographically distributed around the operating domain in which the portable terminals (PP's 5) are likely to be present. In particular it is preferable that beacons 6 are situated in those locations where it is important to detect the presence of the PP's 5 with a greater accuracy. Adding more beacons can be beneficial, since accuracy is related to beacon density, with more beacons providing greater accuracy, as will become apparent from the following parts of the description. It is, however, noted that greater numbers of beacons are likely to give rise to higher overall financial and data handling costs so higher beacon densities can be employed selectively where the application suitably benefits from the increase.

In use the PP's 5 transmit information indicative of their identity and this information is transmitted at a predetermined transmission power level. The power level used to transmit the identity information may be the same as the power level used by the PP's 5 for the transmission of other types of information. Alternatively the power level used by the PP's 5 for transmission of the identity information may be different and this will provide some flexibility in the system for the purposes of reducing power consumption. This transmitted information is in a form that may be received by the location beacons 6 and such reception is thus indicative of the presence of a PP 5. The received power level of the transmitted identity information that is received by a particular beacon 6 will depend on many factors such as the transmission power level, antenna gain of the transmitter, interference, operating terrain and the question of whether a line-of-sight view is established between a given PP 5 transmitting the identity information and a given beacon 6. The gain of the reception antenna provided at the beacon 6 will also have a bearing on the apparent magnitude of the received power level as seen by the internal RF receiving circuits of a receiving beacon. However, for the purpose of the present description, references to received power level are intended to mean the power level available for reception by an antenna, and in particular the power level available for reception by beacon antennas.

The power level of any identity information that is received by a beacon will also be generally influenced by the distance between a given PP 5 transmitting the information and a given location beacon 6, such that the power level received at the beacon decreases with increasing PP-to-beacon separation distance as is well known to the person skilled in the art. This allows the PP 5 to location beacon 6 distance to be estimated on the basis of the power level received at the beacon. Assuming that the factors (other than separation distance) that influence the received power level at a particular location beacon can be accounted for or ignored, it is apparent that if the signal level received from a given PP 5 at a particular beacon 6 is greater than a particular or predetermined power, then that PP 5 can be deemed to be less than a particular (or predetermined) distance from the beacon and may be considered as being "in-range" of the location beacon 6. Furthermore, if the position of the beacon is known then that particular PP 5 can be deemed to be less than the particular (or predetermined) distance from that position.

When the power level received at a beacon 6 is indeed greater than a predetermined power the beacon produces an output indicative of this which is made available to the central control unit 3. This output signal may be considered as an in-range output signal. The output signal contains information that includes identity information of the particular in-range PP 5 although the identity of the location beacon 6 is also made available to the central control unit 3. The central control unit 3 holds information relating to the actual position of the location beacons so that when the central control unit 3 receives an output signal from a beacon 6 (indicating the presence of a nearby PP 5), the identity information of the PP 5 and the identity information of beacon 6 may be converted into information representative of the actual location of a particular PP 5.

In one simple arrangement each beacon output could be directed to an individual input of the central control unit 3. In this case, outputs from the different beacons could be differentiated from each other merely by knowing which beacon is connected to a particular input. However in the presently described example the output signal of the beacon preferably contains information that serves to identify the beacon itself. Outputs of the various location beacons 6 may be transmitted to the central control unit on the occurrence of an in-range condition or at the command of the beacons 6, or the central control unit 3 may poll the beacons 6 to obtain the status of their output, that is, whether or not an output signal is being generated. Furthermore, in the arrangement where identity signals are transmitted from a PP due to initiation by the user, such as may occur when sending an alarm call, it is possible to force an output to be produced by any location beacon, providing of course that the PP producing the alarm is deemed to be within range of the beacon.

As mentioned earlier the accuracy to which location information is required depends on the application and environment. Individual beacons 6 may be adjusted or set so that PP identity information needs to be received with at least a predetermined power level (i.e. above a certain threshold) before the beacon produces an output indicative of the presence of a nearby PP 5. Indeed by raising the threshold a PP 5 must be closer to a location beacon 6 before an in-range output signal is produced than would be the case if a lower threshold is set for that beacon (providing that other factors that may influence the received power level are accounted for or remain unchanged). Where accurate location information of PP's 5 is required, the threshold level may be set comparatively high so that a PP 5 needs to be close to a location beacon before the beacon produces an output signal. Through providing a number of closely positioned beacons 6, each having a high threshold level setting to give a short in-range distance, the location of a PP 5 may be established with a higher degree of accuracy. Where less accurate location information is required the beacons 6 may be separated by greater distances and have lower threshold settings to thus deem PP's 5 that are further away as being in-range. Because the thresholds of the beacons can be set independently, the location beacon system may be tailored to produce a location system providing different levels of location accuracy or a system providing varying levels of location accuracy throughout the anticipated operating domain of the PP's as is required by the application.

The distance between a PP 5 and a location beacon 6 at which a beacon output is produced may be influenced by antenna gain which itself does not need to be isotropic, nor are the beacons limited to having one antenna. This means that the 'in-range' distances around the beacon are not limited to being symmetrically or uniformly distributed around the beacon. One possible arrangement is illustrated in FIG. 1 with region C30 representing coverage area C3 but drawn to an enlarged scale for clarity. Within region C30 a RFP 2 is shown which corresponds to RFP 2 of C3. Also contained in region C30 are beacons 6a and 6b which correspond to two of the beacons 6 of C3. Each beacon 6a and 6b is provided with two antennas; a first antenna for receiving identity information from PP's 5 and a second antenna for making the beacon output signal available to the control unit 3 via an RFP 2. The first antenna does not have an isotropic gain characteristic, which in the case of arbitrarily chosen threshold values, results in an outer limit of the 'in-range' distances for beacons 6a and 6b as represented by loci 7a and 7b respectively. The second antenna of each beacon 6a and 6b does have an isotropic gain characteristic and this is illustrated by loci 8a and 8b for beacons 6a and 6b respectively which represent the boundaries of their coverage area. Their coverage areas are shown as being sufficient to reach RFP 2.

Figure 2:
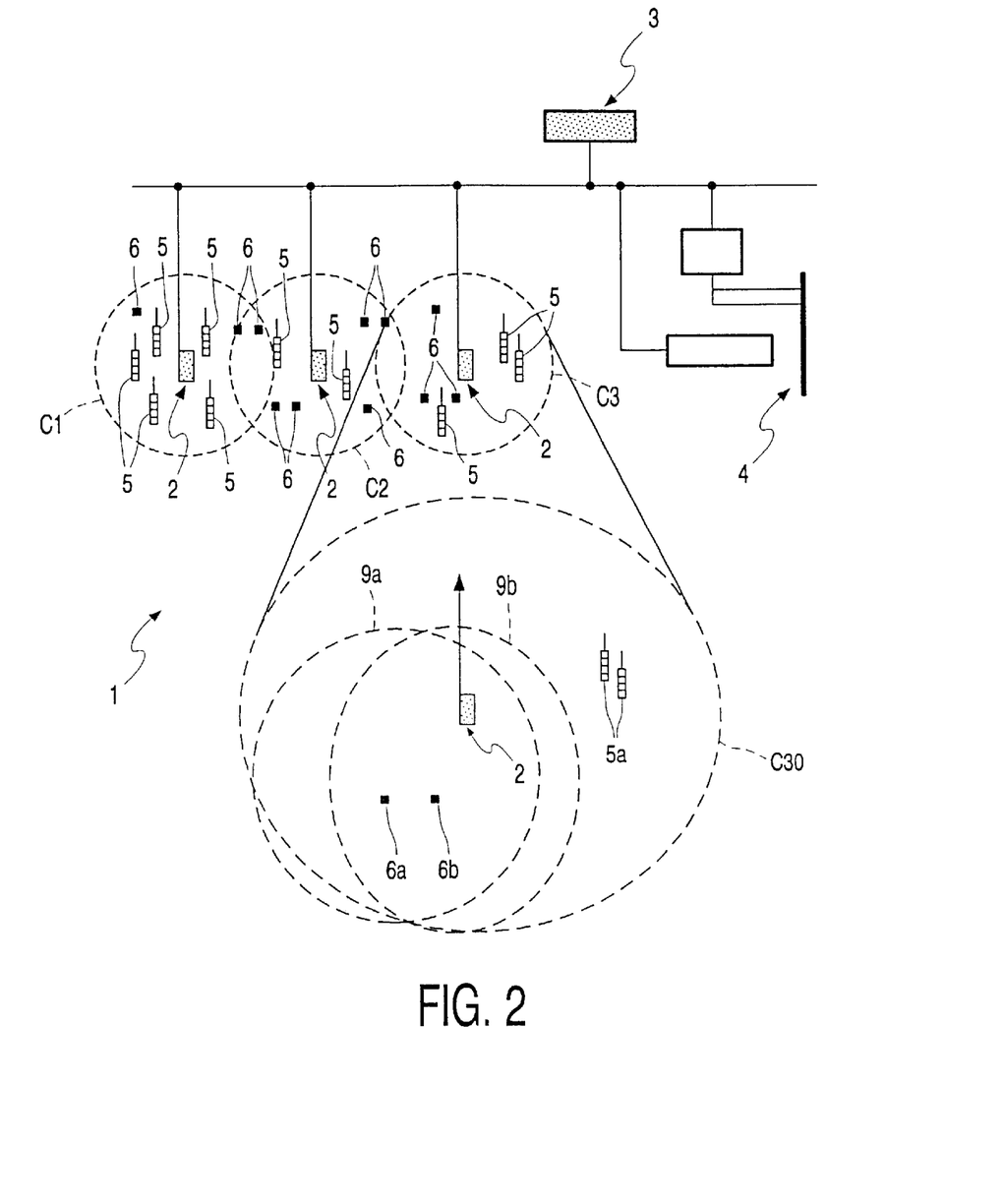
FIG. 2 shows the schematic representation of FIG. 1 but modified by the inclusion of a different type of location beacon.

An alternative arrangement is illustrated in FIG. 2 which also shows region C30 representing coverage area C3 but to an enlarged scale, just as in FIG. 1. In this arrangement, each beacon is provided with a single antenna that serves to receive identity signals from the PP's 5 and to transmit the beacon output signal to the central control unit 3 via a RFP—in this case RFP 2. Again, for arbitrarily chosen threshold values, the 'in-range' distances for beacons 6a and 6b are represented by loci 9a and 9b respectively and in this case the loci also represent the coverage area of the antenna in terms of transmitted beacon output signals. It is noted that although the in range distances and the coverage areas are illustrated in FIG. 2 as being the same, they may in fact be set differently and would then appear as concentric circles. It is further noted that gain characteristics of beacon antennas may be chosen to be isotropic or non-isotropic, regardless of whether the beacon uses a single antenna or a number of antennas.

For a given location beacon, the predetermined power level of received PP identity information necessary for producing the output signal will be influenced by, and may be controlled by, the gain of the involved beacon antenna. However, it is preferable that the required power level is controlled by internal circuitry which may itself be under software control. Where two way communication is provided between the control unit and the location beacon, remote control of this predetermined power level is possible.

It will be appreciated by the person skilled in the art that in the context of the above sections of the description the threshold level of the location beacons 6a and 6b can change depending on the position of a PP5 with respect to the beacons 6 and not merely in terms of absolute distance from a beacon. On the other hand, it is also possible to consider that the beacons 6 are provided with a set threshold internally, and the signals received at the beacon are routed to the internal receiving circuitry via an antenna that is not omni-directional and exhibits varying gain in different directions.

The above explanation refers to an implementation where a beacon output signal is only produced by a given beacon when PP identity information is received with a power level above a predetermined threshold. In another implementation the required predetermined threshold value of each beacon is set to the minimum value that is possible such that it corresponds to the minimum power level of received PP identity information that is required for detection. In practice this means an identity information signal that is received by a beacon with a power level sufficient to be distinguished from background noise produced both internally and externally of the system. Indeed, by setting the predetermined threshold value of a beacon below the background noise level, an output signal will be produced by that beacon regardless of whether or not PP identity information is being received. Information relating to the power level of the received PP identity information is included in the beacon output signal, as well as information to identify the particular PP from which identity information is received and information to identify the location beacon 6. Through knowing the received power level of the PP identity information signal at the beacon, it is possible to calculate the distance between the location beacon and the PP producing the signal. Should PP identity information for a given PP be received by two location beacons, it is possible to calculate the distance of the PP from each.

Figure 3:
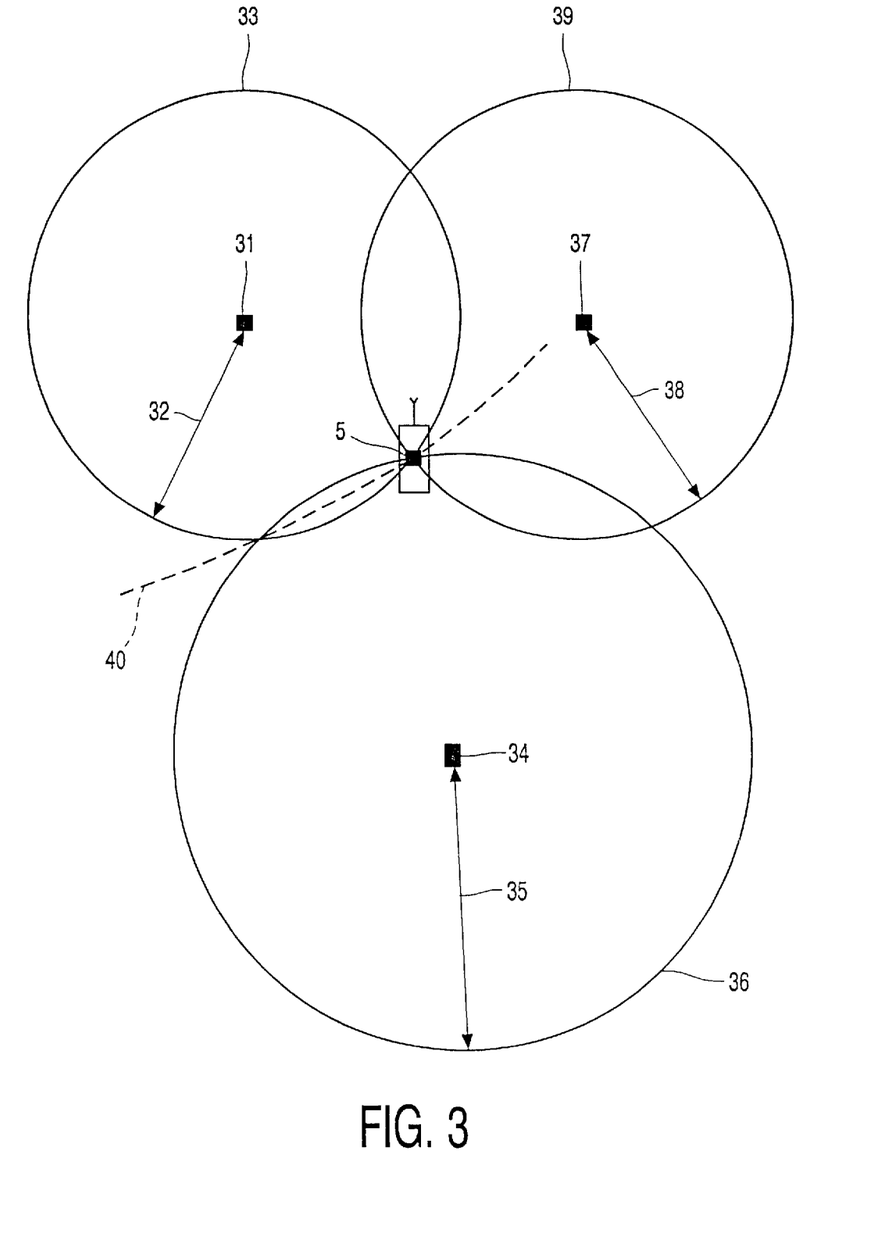
FIG. 3 shows an arrangement of three location beacons in the system of FIG. 1 or FIG. 2.

This principle can be exploited as explained with reference to FIG. 3 which shows a PP 5 producing PP identity information which is being received by location beacons 31, 34 and 37 (beacons 31, 34, 37 are similar to location beacons 6 except that their output signal includes information relating to the power level of the received PP identity information and possibly the predetermined threshold value). Subject to external factors such as the local geography, environment and possible non-isotropic antenna gain, reception of PP identity information signals at beacon 31 with a particular power level will indicate that the portable part is an associated distance 32 from that beacon. However, the received signal strength does not generally convey information relating to the direction of the PP5 with respect to the beacon, so as far as beacon 31 is concerned, the PP could be anywhere along the locus of line 33. Similarly, reception of PP identity information signals by location beacon 34 with a particular power level will indicate that the portable part is an associated distance 35 from that beacon which means that as far as beacon 34 is concerned, the PP is somewhere along the locus of line 36. Finally, reception of the PP identity information signals by location beacon 37 with a particular power level will indicate that the portable part is an associated distance 38 from that beacon, which means as far as beacon 37 is concerned, the PP is somewhere along the locus of line 39. By calculating the point of intersection of the loci 33, 36 and 39 by known methods (sometimes referred to as triangulation-type methods), the location of the PP 5 may be established.

In practice the location of the portable part can be calculated from the received signal strengths in a variety of ways. For example, the distance from any one beacon, in this case beacon 37, is calculated in the above mentioned manner such that the PP is deemed by beacon 37 to be somewhere on locus 39. The power levels of PP identity information received by the other two beacons, for example location beacons 31 and 34, may then be compared and treated as a ratio to establish a locus, for example, locus 40, along which the PP 5 must lie and the intersection of loci 40 and 39 is then calculated by known methods to establish the location of PP 5. PP identity information signal strengths received by a number of beacons may be exploited in other ways to establish the position of a PP. For example, if it is known that the user of a PP is constrained in a particular direction as they are when walking along a narrow corridor or walkway, the position of this PP 5 could be established by analysing the received power levels at just two beacons rather than three. Furthermore, although FIG. 3 and the associated description illustrate the concept of locating a PP in two dimensions, such an approach also works in three dimensions, although output signals from extra location beacons may be required.

Preferably calculations are performed by the central control unit 3 based on the information relating to received PP signal strengths as provided in beacon output signals.

In the case of the specific example as presently described, the location beacon system shown is based on a DECT telecommunications system. The location beacons 6 are based on DECT portable parts (although they are not to be confused with the PP's 5). The PP's 5 transmit information (every 160 ms, for example), indicative of their identity as a connectionless message on an uplink slot. In a DECT system, if an RFP 2 is idle, that is, is not presently involved in supporting a traffic communication, for example voice or data traffic communication, with a PP 5, the RPF 2 emits a signal known as a dummy, in a periodic manner. This dummy is broadcast on a free DECT channel. Any PP's 5 in the vicinity of the RFP 2 are able to scan the DECT channels until they find the channel carrying the dummy. The dummy signal contains important information, including information about the RFP 2 and the system to which it is connected, and this information is used by the PP 5 to synchronise with the RFP 2 and be in a condition ready to make or receive calls. If the RFP is involved in supporting a traffic communication with at least one PP, the important system information is contained in the information transmitted on the DECT channel used for establishing the traffic communication with the particular PP. Any other PP 5 in the vicinity of the RFP 2 can obtain the necessary system information from this transmission and lock on to the RFP 2 as above rather than obtaining the information from the dummy. Indeed, a dummy may not be present if the RFP is involved in supporting traffic communications.

However, in one implementation of this system, all RFP's 2 involved in the location beacon system always maintain an active dummy bearer. This allows all PP's 5 to then be configured to transmit their identity on the uplink slot of the dummy bearer in the form of a connectionless message, the terminology used hereinbefore being understood by the person skilled in the art. This connectionless uplink is only used for conveying information for the purposes of location detection and is not used to carry traffic such as voice or data files. The location beacons are capable of receiving the identity information transmitted by the PP's 5 on the connectionless uplink and as such are configured to receive on the uplink slot of the dummy, although the power level of the information as received at each beacon depends among other things on the PP-to-beacon distance, as has been explained above. If the power level of a given PP's 5 identity signal is received at a location beacon with a value that is greater than the threshold set for that beacon, the beacon will produce an output signal indicating that the PP 5 is within range. The location beacon 6 sends the in-range output signal to the central control unit 3 via a traffic bearer set up to an RFP 2 (connected to the central control unit over the network) and sending the output signal over the traffic bearer. It is noted that the RFP's of this system are capable of setting up a large number of traffic bearers to support the communication of the beacon output signals to the central control unit 3.

The above mentioned implementation of setting beacon threshold values very low to receive PP identity information that is merely detectable, and then including information in the beacon output signals relating to the received power of the PP identity information, can also be based on a DECT telecommunications system.

It will be apparent that each location beacon 6 must be able to hear all in-range PP's 5, and this needs to be the case even if a given in-range PP 5 is synchronised to one RFP 2 and the location beacon 6 is synchronised to a different RFP 2. Since the dummy bearer may be on any available DECT channel, it is quite possible that different RFP's 2 transmit their dummy on different DECT channels to each other. Since the PP's 5 transmit identity signals on the uplink slot of the dummy and the location beacons 6 are configured to receive those signals, this can result in the beacons listening to a different DECT channel than the identity signals are being broadcast on. Also, since DECT channels are defined in terms of carrier frequency and time slot, this means that the dummy of different RFP's 2 may well be on channels having a different carrier frequency and/or time slot allocation to each other. Normally, an uplink slot of the dummy (as is used here for carrying the PP identity information in the form of a connectionless message) is on the same carrier frequency as the dummy itself. However, if a given location beacon is only provided with one receiver, it can only receive on one carrier frequency at a given time. Therefore, for a location beacon to hear all in-range PP's, each PP 5 must transmit its identity information on the same carrier frequency. The implications of this are that the PP's 5 could be required to transmit their identity information on the dummy uplink (in the form of a connectionless message) on a different carrier frequency to the dummy (downlink) signal itself. This is not usually the case in a standard DECT implementation.

Another problem can arise when a RFP is supporting traffic bearers or the RFP is heavily loaded, in which case it is normally unnecessary and/or undesirable to maintain an active dummy bearer. In these cases a DECT channel is assigned for supporting a connectionless uplink for carrying the PP identity information. Even so, it is still only possible for a location beacon to receive on one carrier frequency at a time. However, through using the same carrier frequency throughout the system for transmitting PP identity information signals, by setting up all location beacons to receive on this carrier frequency all location beacons will be capable of hearing PP identity information of all in-range PP's. (Note there may still be an overall limit to the PP's that can be heard at a given time due to other factors relating to operation of the system, such as the particular scale of the build).

Another possible solution is to designate different DECT channels for supporting the connectionless uplink messages (that carry the PP identity information) in different parts of the system. PP's 5 and location beacons 6 could transmit/listen respectively to PP identity information on a different carrier frequency and be instructed to change DECT channels dynamically. This could be done under control of the central control unit 3 and/or on establishing a given PP 5 is in a particular location. PP's 5 and location beacons 6 could be instructed to do this by means of a short page message.

The carrier used for the connectionless uplink may be determined by the Primary Scan Carrier Number (PSCN).

The identity that is transmitted by a PP in the identity information may be an assigned portable part MAC identity (PMID), which will be understood be the person skilled in the art. Alternatively a proprietary system may be used. The use of a default PMID is not necessarily sufficient to uniquely identify a PP 5 within the system. PMID assignment is performed during location registration and there is only one location area in the whole system.

Each location beacon may undergo an on-air subscription to the central control unit 3. However, a system of pre-subscription could be used. Some authentication procedures could be included.

Preferably the system also supports standard DECT functions so that voice and data communications may be available to the portable parts in the usual way. Normal traffic bearers, as are used for the exchange voice and data file information between the PP's 5 and the RFP's 2, are therefore set up in the normal way. However, it is important to accommodate the requirement for the location beacon output to be relayed to the central control unit 3 by means of a traffic bearer set up between the location beacons and the RFP's 2.

In one example where the location beacon 6 is essentially a DECT portable part with two antennas, one antenna is used for communication with the RFP 2 for communication of information including the output signal, while the other antenna receives the PP 5 identity information, as has already been described above. Whether or not two antennas are used, the principle of using a low gain antenna and/or setting the threshold value by circuitry and/or software in the location beacons will allow implementations where PP's 5 transmit their identity information with a power level similar to that power level used for normal traffic communication with an RFP, without the PP 5 necessarily being deemed to be within-range of a number of location beacons 6.

Even though the position of a location beacon needs to have a known position to be of any use, this position does not need to be fixed. Indeed, it can be advantageous for location beacons to be re-positioned easily, providing the new position is updated in the central control unit. The position of a location beacon does not need to be known in the absolute sense, that is, a location beacon could be provided in a vehicle that is capable of movement. Although the location of the vehicle may be unknown, it may be sufficient to know that a particular terminal is near to, or located in, the vehicle. It may also be sufficient to merely know which room a location beacon is situated in.

One use of the location beacon system described herein is to track the movement of personnel, for example, a security guard. By equipping the security guard with a PP their movement may be monitored. Security guards are sometimes required to perform a guard tour around the premises and the tour will often be along a pre-arranged route. The progress of the guard along the route can be monitored automatically and should a guard deviate from the route or the progress be irregular or stop, an alarm could be raised automatically. This could be done by the central control unit 3 providing that it is provided with details of the tour.

Each PP 5 may be provided with an alarm facility allowing the user to initiate an alarm signal to other parts of the system. The alarm signal is preferably initiated from the PP 5 and sends a signal to an RFP 2 directly, although the position of the PP 5 originating the alarm signal will be known by means of the beacons.

On initiation of an alarm call operation parameters of the system could be modified. For example, the threshold values of some or all beacons could be reduced and the beacons instructed to receive identity information of the portable part that the alarm call originated from to accurately locate that portable part. So called triangulation-type methods could additionally or alternatively be used to accurately locate that portable part.

If the PP's transmit their identity information regularly, this may be done, for example every 160 ms. A typical in-range portable part to beacon distance is in the order of 2 meters, although this distance is variable depending on the requirements of the application.

References to the term 'power level' are made with the understanding that a broad interpretation is to be given to such a term. The term may therefor be read as 'field strength' for example, or other such terms generally understood to have a similar meaning.

From reading the present disclosure, other modifications will be apparent to persons skilled in the art. Such modifications may involve other features which are already known in the design, manufacture and use of systems and devices and component parts thereof and which may be used instead of or in addition to features already described herein.

What is claimed is:

1. A telecommunications system, comprising:
   a portable terminal operable to perform a wireless transmission of an identity signal including an identity of said portable terminal;
   a first location beacon operable to receive the identity signal and to perform a transmission of a first beacon signal in response to a reception of the identity signal wherein the identity signal is at a first power level greater than a first predetermined threshold value, the transmission of the first beacon signal by said first location beacon being indicative of said portable terminable being within a first distance range from said first location beacon, the first beacon signal including the identity of the portable terminal; and
   a base station operable to receive the first beacon signal and to perform a wireless communication with said portable terminal involving the exchange of traffic,
   wherein the wireless communication between said base station and said portable terminal involving the exchange of traffic is based on the first beacon signal.

2. The telecommunications system of claim 1, further comprising:
   a central control unit;
   wherein said base station is further operable to perform a transmission of the first beacon signal to said central control station, the first beacon signal further including the first power level;
   wherein said central control station is operable to calculate a location of said portable terminal based on the first power level; and
   wherein the wireless communication be said base station and said portable terminal involving the exchange of traffic is based on the calculated location of said portable terminal.

3. The telecommunications system of claim 1, further comprising:
   a central control unit operable to set the first predetermined threshold value, said central control unit further operable to communicate a setting of the first predetermined threshold value by said central control unit to said first location beacon.

4. The telecommunications system of claim 1, comprising:
   a central control unit operable to control a general operation of said telecommunications system under a Digital Enhanced Cordless Telecommunications standard.

5. The telecommunications system of claim 1, further comprising:
   a second location beacon operable to receive the identity signal and to perform a transmission of a second beacon signal in response to a reception of the identity signal wherein the identity signal is at a second power level greater than a second predetermined threshold value, the transmission of the second beacon signal by said second location beacon being indicative of said portable tenable being within a second distance range from said second location beacon, the second beacon signal including the identity of said portable terminal;

wherein said base station is further operable to receive the second beacon signal; and wherein the wireless communication between said base station and said portable terminal involving the exchange of traffic is based on the first beacon signal and the second beacon signal.

6. The telecommunications system of claim 5, further comprising:

a central control unit;

wherein said base station is further operable to perform a transmission of the first beacon signal and the second beacon signal to said central control station, the first beacon signal further including the first power level, the second beacon signal further including the second power level;

wherein said central control station is operable to calculate a location of said portable terminal based on the first power level and the second power level; and wherein the wireless communication between said base station and said portable terminal involving the exchange of traffic is based on the calculated location of said portable terminal.

7. The telecommunications system of claim 5, further comprising:

a central control unit operable to set the first predetermined threshold value and the second predetermined threshold value, wherein said central control unit is further operable to communicate a first setting of the first predetermined threshold value by said central control unit to said first location beacon and to communicate a second setting of the second predetermined threshold value by said central control unit to said second location beacon.

8. The telecommunications system of claim 5, wherein the first predetermined threshold value and the second predetermined threshold value are identical.

9. The telecommunications system of claim 5, further comprising:

a central control unit operable to control a general operation of said telecommunications system under a Digital Enhanced Cordless Telecommunications standard.

10. The telecommunications system of claim 5, further comprising:

a third location beacon operable to receive the identity signal and to perform a transmission of a third beacon signal in response to a reception of the identity signal wherein the identity signal is at a third power level greater than a third predetermined threshold value, the transmission of the third beacon signal by said third location beacon being indicative of said portable terminable being within a third distance range from said third location beacon, the third beacon signal including the identity of said portable terminal;

wherein said base station is further operable to receive the third beacon signal, and wherein the wireless communication between said base station and said portable terminal involving the exchange of traffic is based on the first beacon signal, the second beacon signal, and the third beacon signal.

11. The telecommunications system of claim 10, further comprising:

a central control unit;

wherein said base station is further operable to perform a transmission of the first beacon signal, the second beacon signal and the third beacon signal to said central control station, the first beacon signal further including the first power level, the second beacon signal further including the second power level, the third beacon signal further including the third power level;

wherein said central control station is operable to calculate a location of said portable terminal based on the first power level, the second power level, and the third power level; and wherein the wireless communications between said base station and said portable terminal involving the exchange of traffic is based on the calculated location of said portable terminal.

12. The telecommunications system of claim 10, further comprising:

a central control unit operable to set the first predetermined threshold value, the second predetermined threshold value and the third predetermines threshold value, wherein said central control unit is further operable to communicate a first setting of the first predetermined threshold value by said central control unit to said first location beacon, to communicate a second setting of the second predetermined threshold value by said central control unit to said second location beacon, and to communicate a third setting of the third predetermined threshold value by said central control unit to said third location beacon.

13. The telecommunications system of claim 10, wherein first predetermined threshold value and the second predetermined threshold value are identical.

14. The telecommunications system of claim 10, further comprising:

a central control unit operable to control a general operation of said telecommunications system under a Digital Enhanced Cordless Telecommunications standard.

* * * * *